Patented Nov. 14, 1939

2,179,552

UNITED STATES PATENT OFFICE 2,179,552

DYESTUFFS OF THE ANTHRAQUINONE SERIES

Donald P. Graham, Wilmington, Del., assignor to E. I. du Pont de Nemours & Company, Wilmington, Del., a corporation of Delaware No Drawing. Application June 25, 1938, Serial No. 215,875

4 Claims. (Cl. 260—368)

This invention relates to the preparation of new compounds of the anthraquinone series, and has for its object the preparation of new diaroylaminoanthraquinone compounds which carry in the 6-position an anthraquinonylaminocarbonyl group, of the following general formula:

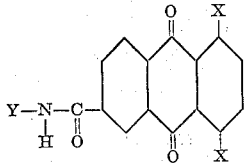

wherein X stands for the aroylamino radicals of the benzene series and Y stands for an anthraquinone radical directly attached to the nitrogen, which dye in desirable red to red brown shades of good fastness properties, and which are characterized by being cold dyeing colors.

I have found that new and valuable dyestuffs may be prepared from 1:4-dichloro-6-anthraquinonecarbonyl chloride, a compound which, although known in the prior art, has heretofore not been employed commercially in the preparation of dyestuffs. On the condensation of this intermediate with aminoanthraquinone compounds, a dyestuff intermediate is produced in which the two halogen atoms may be replaced by amino groups which in turn may be substituted by aroyl radicals, particularly of the benzene series, and that the resulting aroylaminoanthraquinone dyestuffs dye in much faster shades and show greater affinity than the 1,4-diacidylaminoanthraquinone compounds which do not contain a carbonyl group in the 6-position.

According to this invention, 1,4-dichloro-6-anthraquinonecarbonyl chloride, (which may be prepared by treatment of the 1,4-dichloro-6-anthraquinonecarboxylic acid of German Patent 255,121 with phosphorus pentachloride in an inert organic solvent), is condensed with an anthraquinone amine. The resulting condensation product is then condensed with two moles of paratoluene sulfonamide to replace the chlorine in the 1:4 positions. The disulfonamido compound is then hydrolyzed in sulfuric acid to give a free amino compound. This product is then condensed with two moles of an aromatic acid chloride of the benzene series to give the diaroylamino derivative formulated above.

The following examples are given to illustrate the invention. The parts used are by weight.

Example 1

18 parts of 1,4-dichloro-6-anthraquinonecarbonyl chloride and 17 parts of 1-amino-4-benzoylaminoanthraquinone are slurried in 400 parts of nitrobenzene, heated to 150 to 160° C. for ½ hour, cooled to 70° C., filtered, and the cake washed with 100 parts of nitrobenzene. This cake is reslurried in 100 parts of nitrobenzene with 25 parts of p-toluene sulfonamide, 10 parts of soda ash, 1 part of copper acetate, and 0.1 part of copper powder. The mass is heated to 200 to 208° C. for 1 to 3 hours, cooled to room temperature, diluted with 25 parts of alcohol and filtered. The cake is washed with alcohol, followed by water, and dried. The product is an orange colored solid dissolving in sulfuric acid with an orange to red color. 25 parts of the product obtained as described above are dissolved in 500 parts of 96% sulfuric acid at 5 to 8° C. The temperature is allowed to rise to 20° C. and is held at 18 to 20° C. for 2 hours. The charge is cooled to 5° C., drowned in 5000 parts of ice water and filtered. The cake is washed acid-free and dried. The product is a dark brown solid dissolving in concentrated sulfuric acid with a yellow to brown color.

15 parts of the above diamino condensation product is slurried in 300 parts of nitrobenzene. The mass is heated to 150 to 160° C. and 10 parts of benzoyl chloride are added during 15 minutes. The charge is held at 150 to 160° C. for 30 minutes and filtered at 150° C. The cake is washed with nitrobenzene, followed by alcohol, and dried. The product is a solid separating out in red crystals. It dissolves in 96% sulfuric acid with a yellow to orange color and dyes cotton in red shades from a bordeaux to violet colored vat. This product shows a marked superiority in light fastness to the somewhat analogous 1,4-dibenzoylaminoanthraquinone. The structure of this dyestuff may be represented as follows:

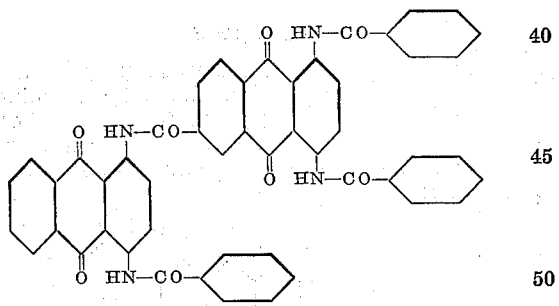

Example 2

If 1-amino-5-benzoylaminoanthraquinone be substituted for 1-amino-4-benzoylaminoanthraquinone in the synthesis described in the preceding example, an isomeric product is obtained which dyes cotton in reddish brown shades. This product has the following structure:

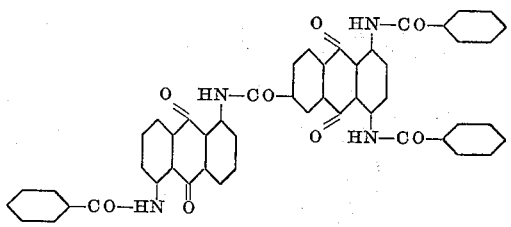

Example 3

Employing the general methods outlined in Example 1, one molecular proportion of 1,4-diaminoanthraquinone is condensed with two molecular proportions of 1,4-dichloro-6-anthraquinonecarbonyl chloride. The chlorine atoms are replaced by amino groups and the resulting amine benzoylated. The product dyes cotton in bordeaux brown shades. It has the following formula:

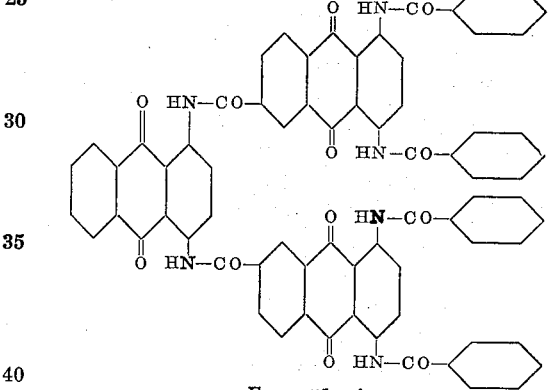

Example 4

By substituting 1,5-diaminoanthraquinone for 1,4-diaminoanthraquinone in the synthesis outlined in Example 3, a reddish brown vat dyestuff is obtained, which has the following structure:

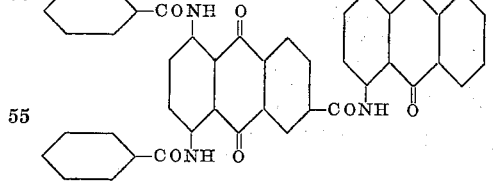

Example 5

The substitution of a molecular proportion of 1-amino-4-methoxyanthraquinone for 1-amino-4-benzoylaminoanthraquinone in the synthesis described in Example 1 results in a red brown vat dyestuff having the following probable constitution:

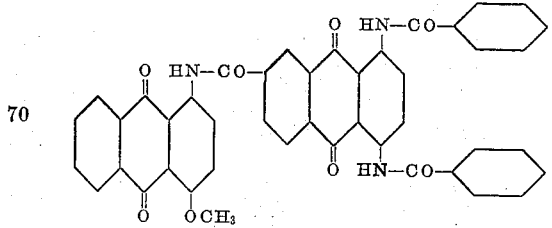

As illustrated in the above examples, the anthraquinone amine employed in the first condensation may have further substituents, such as benzoylamino radicals, alkoxy or other groups which do not tend to condense with acid chlorides employed in the second condensation reaction. The aromatic acid chlorides employed may be of any of those of the benzene series.

I claim:

1. Anthraquinone compounds of the following general formula:

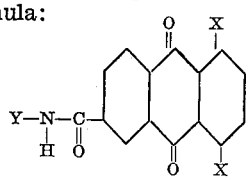

wherein X stands for aroylamino radicals of the benzene series and Y stands for an anthraquinone radical directly attached to the nitrogen.

2. Anthraquinone compounds of the following general formula:

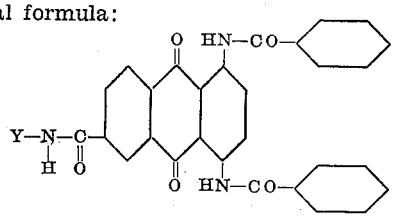

wherein Y stands for an anthraquinone radical directly attached to the nitrogen.

3. The dyestuff of the following formula:

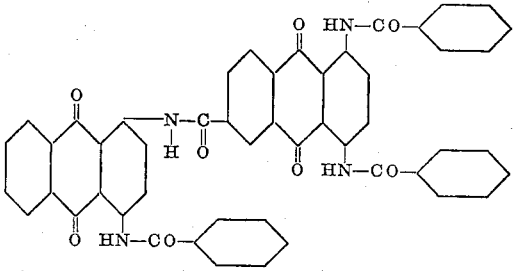

which dyes cotton in red shades.

4. The dyestuff of the formula:

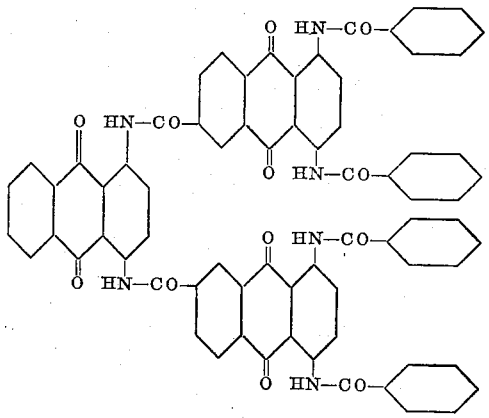

which dyes cotton in bordeaux brown shades.

DONALD P. GRAHAM.